(12) United States Patent
Eshelman et al.

(10) Patent No.: US 12,523,592 B2
(45) Date of Patent: Jan. 13, 2026

(54) METHOD AND SYSTEM FOR MEASURING FLOW AND COMPOSITION OF SINGLE AND MULTI-PHASE FLUIDS

(71) Applicant: Impossible Sensing LLC, St. Louis, MO (US)

(72) Inventors: Evan Eshelman, Bozeman, MT (US); Kirby Simon, St. Louis, MO (US); Christopher Sudlik, Normandy, MO (US); Ariel Torre, Calgary (CA); Pablo Sobron, St. Louis, MO (US)

(73) Assignee: Impossible Sensing LLC, St. Louis, MO (US)

( * ) Notice: Subject to any disclaimer, the term of this patent is extended or adjusted under 35 U.S.C. 154(b) by 352 days.

(21) Appl. No.: 17/680,281

(22) Filed: Feb. 24, 2022

(65) Prior Publication Data

US 2022/0390350 A1 Dec. 8, 2022

Related U.S. Application Data

(60) Provisional application No. 63/152,850, filed on Feb. 24, 2021.

(51) Int. Cl.
*G01N 15/1434* (2024.01)
*G01F 1/661* (2022.01)
*G01F 1/74* (2006.01)

(52) U.S. Cl.
CPC ......... *G01N 15/1434* (2013.01); *G01F 1/661* (2013.01); *G01F 1/74* (2013.01)

(58) Field of Classification Search
CPC ........ G01N 15/1434; G01F 1/661; G01F 1/74
See application file for complete search history.

(56) References Cited

U.S. PATENT DOCUMENTS

| | | | | |
|---|---|---|---|---|
| 4,309,615 A | * | 1/1982 | Kowalski | A61B 6/4085 976/DIG. 429 |
| 6,312,914 B1 | * | 11/2001 | Kardos | G01N 21/645 435/7.1 |
| 2002/0196170 A1 | * | 12/2002 | McIlrath | H04N 25/772 348/E3.018 |
| 2004/0001618 A1 | * | 1/2004 | Johnson | G06T 11/006 382/131 |
| 2007/0233396 A1 | * | 10/2007 | Tearney | G01N 21/6486 702/19 |
| 2012/0190967 A1 | * | 7/2012 | Nahm | A61B 6/548 600/479 |

* cited by examiner

*Primary Examiner* — Chih-Cheng Kao
(74) *Attorney, Agent, or Firm* — Goodwin Procter LLP

(57) ABSTRACT

A system comprising an assembly of sensing elements that could be attached to, mounted upon, or installed into pipes for on-line, in-line or off-line characterization of fluid flows. The system may be hand-held by a human operator or implemented in benchtop instrumentation. The sensing elements comprise one or more sensors and one or more light-emitting diodes (LEDs) or lasers that can be configured in a variety of different orientations to investigate the fluorescence of the subject material by illuminating or exciting the subject material with the LEDs or lasers and collecting the electromagnetic signal returned from the subject material with the sensors. The architecture of the system is applicable to characterize both static and dynamic samples. Samples of the subject material include single-component solid, liquid, or gaseous materials or may also include single-phase, two-phase or multi-phase mixtures of solids, liquids and gases.

20 Claims, 3 Drawing Sheets

SECTION A-A
SCALE 1 : 1

METHOD AND SYSTEM FOR MEASURING FLOW AND COMPOSITION OF SINGLE AND MULTI-PHASE FLUIDS

RELATED PATENT APPLICATIONS AND INCORPORATION BY REFERENCE

This application claims priority to U.S. Provisional Patent Application Ser. No. 63/152,850, filed on Feb. 24, 2021, the disclosure of which is hereby incorporated by reference in its entirety.

STATEMENT REGARDING FEDERALLY SPONSORED RESEARCH OR DEVELOPMENT

The present invention was made with no governmental support.

FIELD OF THE INVENTION

The invention relates to systems and methods of detecting characteristics of single-phase and multi-phase solid, liquid and gaseous matter.

BACKGROUND OF THE INVENTION

Prior art systems for detecting characteristics of single-phase and multi-phase solid, liquid and gaseous matter, such as compositions, flow rates and other relevant parameters of fluid flows, are limited and problematic for a variety of reasons. For example, prior art systems relying upon mechanical characterization techniques require physical interaction of the fluid with the system. Further, prior art systems relying upon optical characterization techniques are unreliable because of interference with electromagnetic signal that occurs due to the presence of bubbles, droplets, particles, and other features in the flow that absorb, refract, or distort the electromagnetic signal from the material before it reaches the sensor. This issue is especially pronounced in dynamic systems of multi-phase and multi-component fluids. Prior art systems currently utilized in industrial applications, such as the oil and gas industry, are sub-optimal because they require physical sampling of fluids for off-line analysis of the composition (i.e., volumetric ratio of oil to water). Also, such systems traditionally require having to route multiple fluid streams to a single centralized location where sampling and off-line analysis can occur, adding cost and complexity to implementation.

There is a need for a system that overcomes the aforementioned disadvantages of the prior art.

SUMMARY OF THE INVENTION

In view of the above, it is an object of the present invention to provide a system for detecting characteristics of single-phase and multi-phase solid, liquid and gaseous matter that requires no physical interaction with the matter under investigation, does not suffer from interference with the signal communicated from the fluid to the sensor(s) and does not require physical sampling of the matter under investigation for off-line analysis.

In accordance with the present invention, there is provided a system comprising an optical assembly of sensing elements that could be attached to, mounted upon, or installed into pipes for the on-line, in-line, or off-line characterization of fluid flows. The system of the present invention may be hand-held by a human operator or implemented in benchtop instrumentation commonly found in academic, industrial, or national laboratories. The sensing elements consist of one or more sensors and one or more light-emitting diodes (LEDs) or laser(s) that can be configured in different orientations (i.e., array, matrix, ring or any other known orientation) to investigate the fluorescence of a material under investigation by illuminating or exciting the material under investigation with the LED(s) or laser(s) and directing an electromagnetic signal from the material under investigation to the sensor(s). The architecture is applicable to characterize both static and dynamic fluid samples, including single-component, two-component, and/or multi-component solid, liquid, or gaseous materials. Samples may also be single-phase, two-phase, or multiphase mixtures of solid, liquids, and/or gases.

SUMMARY OF THE INVENTION

Figure 1:
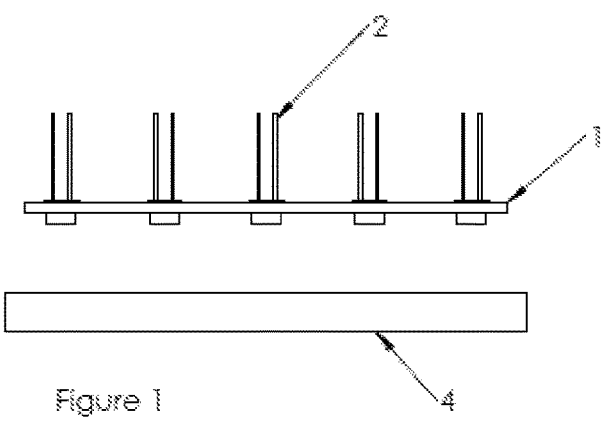
FIG. 1 is a side view of a preferred embodiment of the present invention having a linear array of sensing elements.

According to one embodiment, the present system is an optical assembly of sensing elements that could be attached to, mounted to, or installed into pipes for the on-line, in-line, or off-line characterization of fluid flows, hand-held by a human operator, or implemented in benchtop instrumentation (academic, industrial, or national laboratories). The sensing elements consist of one or more sensors and one or more light-emitting diodes (LEDs) or laser(s) that can be configured in different orientations (array, matrix, ring, other) to investigate the fluorescence of a material under investigation by illuminating or exciting the material under investigation with the LED(s) or laser(s) and collecting electromagnetic signal back from the material under investigation with the sensor(s). The architecture is applicable to characterize both static and dynamic samples. Samples include single-component, two-component, and/or multi-component solid, liquid, or gaseous materials. Samples may also be single-phase, two-phase, or multiphase mixtures of solid, liquids, and/or gases.

DETAILED DESCRIPTION

The following detailed description is merely exemplary in nature and is not intended to and should not be interpreted to limit the embodiments described herein. Although particular embodiments are described, those embodiments are merely exemplary implementations of the system of the present invention. The following descriptions and illustrations herein should be considered illustrative in nature, and thus, not in any way limiting the scope of the present invention. One skilled in the art will recognize other embodiments are possible and all such embodiments are intended to fall within the scope of the present disclosure. While the preferred embodiments are described with reference to the above drawings, there is no intent to limit the disclosure to the embodiments shown in the drawings or disclosed herein. Rather, the intent is to include all alternatives, modifications and equivalents that embody the spirit and scope of the disclosure.

It is also to be understood that the disclosure uses terminology for the purpose of describing particular embodiments and such terminology is not intended to be limiting.

Unless defined otherwise, all technical and scientific terms used in this disclosure have the same meaning as commonly understood by one of ordinary skill in the art to which is applicable to this disclosure.

As will be apparent to those of skill in the art upon reading this disclosure, each of the embodiments described and illustrated herein has discrete components and features which may be readily separated or combined with features of any of the other possible embodiments without departing from the spirit and scope of the present disclosure.

The following definitions apply to the terms listed below and are provided to aid in understanding the present invention, as described herein:

"Sensor"—used when referring to the photodiodes.
"LED"—used when referring to the LEDs.
"Sensing Element"—used when referring to the sensor/LED combination.
"Sensing Element Array"—used when referring to an array of sensing elements, such as in the linear configuration or in the ring configuration, for example.
"UV MPFM" or "UV Multiphase Flow Meter"—used when referring to the application of the sensing element arrays of the present invention to perform UV MPFM measurements.
"In-line"—all flow is measured in the pipe without interfering with flow field.
"On-line"—a portion of the flow is siphoned off for measurement and returned to the system.
"Off-line"—sample is taken from the flow and measured, not to be returned to the system.

The working principle of the system of the present invention is based upon measuring differences in the fluorescence signal of the fluid under investigation when excited with ultraviolet (UV) light. The architecture of the preferred embodiment uses process tomography to obtain cross-sectional images of the flow.

In a preferred embodiment, by coordinating the pulsing and readout of a series of LEDs 3 and photodiodes 2, each series representing a cross-section of the pipe, the composition within the pipe can be extracted. The volume fraction distribution of phases is obtained from this data by measuring changes in flow properties, such as optical density, by arrays of transducers placed in a plane perpendicular to the direction of the flow. The transducer pair preferably consists of an ultra-violet LED and sensing photodiodes on the opposing wall. UV light pulses from the emitter 3 are measured by the photodiodes 2 on the opposing wall of the pipe. Thus, signal response is a function of the attenuation and fluorescence in the flow, i.e. composition. Bandpass filters (not shown) in front of the photodiodes 2 may advantageously provide wavelength discrimination required for compositional determination. Analog signals from an array of multiplexed sensors 2, covering a cross-section of a pipe, are converted into digital form, and passed into an image reconstruction system that images the cross-section of the flow regime. This optical transduction architecture allows for high-rate data capture (kHz range) through ultrafast electronic LED and sensor switching.

The system of the present invention advantageously provides sensitivity, spatial resolution, and ability to perform label-free measurements. LEDs and photodiode readout rates can be adjusted at speeds from Hz to kHz speeds in order to obtain a series of images resolved in real-time. In the preferred embodiment shown in FIGS. 5 and 6, in addition to providing precise composition, the system determines accurate volumetric flow rates of the different phases by imaging fluorescence cross-sections of the flow at different spatial positions by using two sensing rings 12 composed of similar UV and photodiode arrangements. For a standard wellhead two-inch pipe diameter, approximately 22 LEDs can be mounted in this configuration in each ring 12. It will be understood by one of skilled in the art that any suitable number of LEDs 3 can be mounted in this configuration. The present system can use any known suitable UV LEDs 3 and photodiodes 2 from a variety of vendors, including Boston Electronics, Thorlabs, and HAMAMATSU, for example. The LEDs 3 cover a range of wavelengths from deep UV (approximately 255 nm) to near visible (approximately 350-400 nm), or within any other suitable range sufficient to both maximize the UV fluorescence signal generated and maximize transmission for cross sectional measurements. The LEDs 3 are rapidly pulsed at kHz repetition rates to obtain time-series flow measurements, decrease background noise, and manage the thermal balance of the LEDs. Rapidly pulsing the LEDs 3 also allows LEDs 3 to be illuminated sequentially, enabling tomographic measurements, with full illumination cycles occurring on time scales of Hz to kHz.

The architecture of the system of the present invention comprises a series of sensing elements, wherein each sensing element is comprised of one or more sensors 2 and one or more light-emitting diodes (LEDs) 3. Each sensor 2 is preferably covered by a bandpass optical filter in order to filter out electromagnetic signal at wavelengths above and below the specified band, thus enabling each sensor 2 to detect specific wavelengths of light. The LEDs 3 of two different UV wavelengths of light are used to investigate differences in the optical response of the material related to the excitation wavelength used. A preferred embodiment of the present invention is comprised of a plurality of sensing elements, each consisting of one sensor 2 and one LED 3, with the sensing elements aligned in a linear sensing element array. Although the any suitable number of sensing elements may be employed, in a preferred embodiment, four identical sensors 2 are used (such as, for example, photodiodes from Hamamatsu, part number S1227-33BQ) with each sensor surface covered by a different bandpass optical filter. The four filters used in the preferred embodiment allow for four different bands of light to pass through the filter to impact upon the sensor 2: roughly 270-310 nm (Semrock, part number FF01-292/27-25), roughly 310-360 nm (Semrock, part number FF01-334/40-25), roughly 375-425 nm (Semrock, part number FF01-400/40-25), and roughly 422-495 nm (Semrock, part number FF01-458/64-25). Further, in this preferred embodiment, four LEDs 3 are used, including one LED 3 that emits UV radiation at 265 nm (Boston Electronics, part number VPS134) and three LEDs 3 that emit UV radiation at 285 nm (Boston Electronics, part number VPS174). It is understood by one skilled in the art that any known suitable sensors 2 and LEDs 3 may be used in the system as described herein and the descriptions of the preferred sensors 2 and LEDs 3 should not be construed as limiting in any way.

FIG. 1 illustrates the present linear array architecture, according to one preferred embodiment. The operation principle, i.e., measuring fluorescence signal from a sample resulting from illumination at specific wavelength(s) of light, is modular however and can be implemented by employing any one of several different architectures. The array architecture shown in FIG. 1 is provided as but one of many possible arrays that would be suitable for the system as described herein.

Figure 2:
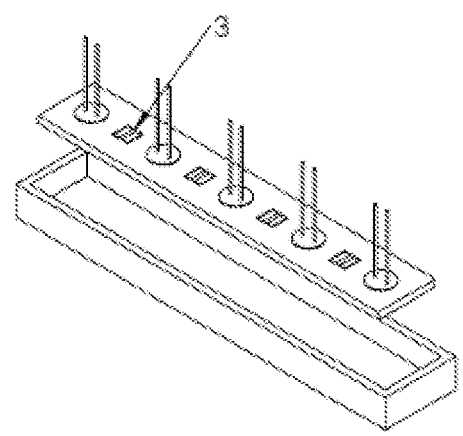
FIG. 2 is a perspective view of a preferred embodiment of the present invention having a linear array of sensing elements.
Figure 4:
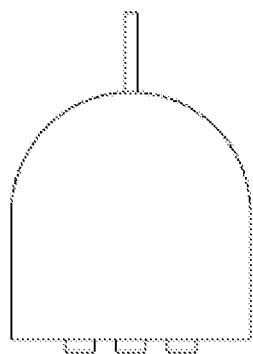
FIG. 4 is a side view of a preferred embodiment of the present invention having a non-linear array of sensing elements.
Figure 3:
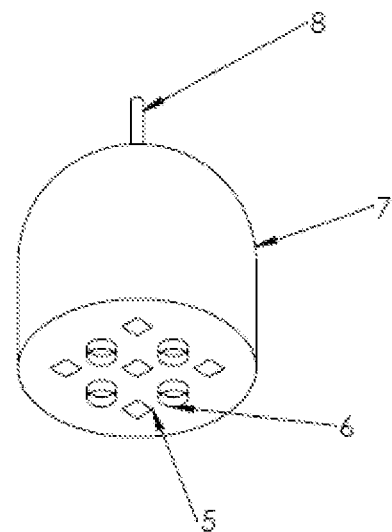
FIG. 3 is a perspective view of a preferred embodiment of the present invention having a non-linear array of sensing elements.
Figure 5:
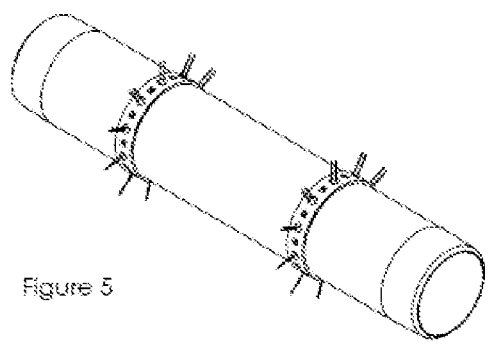
FIG. 5 is a perspective view of a preferred embodiment of the present system having a plurality of sensing elements arranged in a ring-shaped configuration and mounted upon a pipe.
Figure 6:
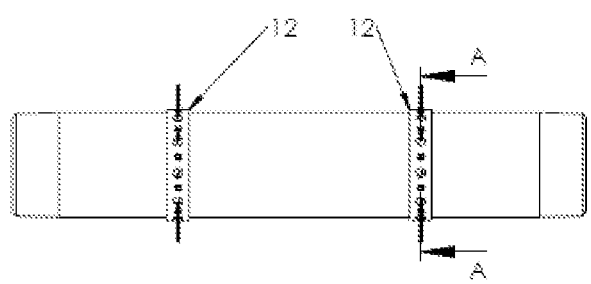
FIG. 6 is a side view of a preferred embodiment of the present system having a plurality of sensing elements arranged in a ring-shaped configuration and mounted upon a pipe.
Figure 7:
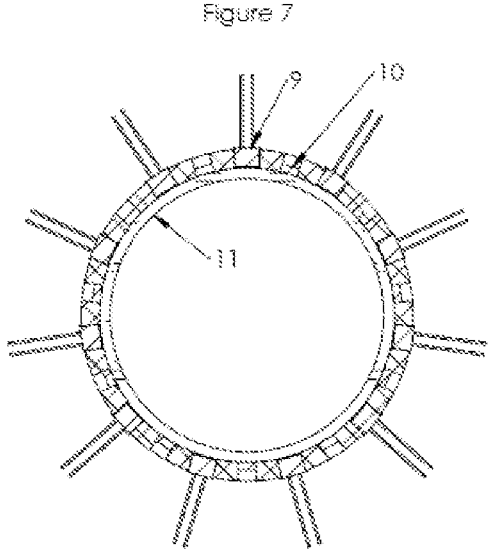
FIG. 7 is a cross-sectional view of a preferred embodiment of the present system having a plurality of sensing elements arranged in a ring-shaped configuration.

FIGS. 2, 3, and 5, respectively, demonstrate three alternate embodiments of the present system. These illustrated alternate architectures are the following: (1) a nonlinear array of sensing elements (shown in FIG. 3); (2) a ring of sensing elements (shown in FIG. 5); and (3) a linear array of sensing elements (shown in FIG. 2). The UV LEDs 3, 5, 10, shown in FIGS. 2, 3 and 7, respectively, are patterned to illuminate a sample with UV light. UV detecting photodiodes 2, 6, 9, as shown in FIGS. 1, 3 and 7, respectively, record fluorescence of the sample and, further, in the case of opposing LEDs 3, 5, 10 and photodiodes 2, 6, 9, also record transmission of light through the sample. In the case of an in-line sensor, a window 11 (shown in FIG. 7) with high UV transmission, such as optical sapphire or UV-fused silica, isolates the LEDs 10 and photodiodes 9 from sample material and is sealed appropriately for pressure and temperature conditions expected per use case. For an in-line sensor, two separate sensing arrays are advantageously used and positioned at a set distance apart to enable the calculation of volumetric flow rates of constituents in the piping system in real time or over time.

Having described the preferred embodiment of the present invention, any number of changes, variations and improvements which may be apparent to those skilled in the art are within the scope of the invention claimed and described herein.

What is claimed is:

1. A system for detecting characteristics of fluid matter flowing through a pipe, comprising:
   at least one transducer pair attached to the pipe, the transducer pair having:
   (i) at least one optical light source to illuminate the fluid matter flowing through the pipe; and
   (ii) at least one sensor to collect a signal from the optical light source illuminating the fluid matter flowing through the pipe;
   wherein the optical light source transmits light pulses to the sensor and the sensor collects and measures signals created by the optical light source illuminating the fluid matter;
   a bandpass filter, positioned in front of the sensor, to provide wavelength discrimination for determining attenuation and fluorescence of the fluid matter flowing through the pipe;
   a processor, communicatively coupled to the sensor, to receive, from the sensor, analog signals as a function of the attenuation and fluorescence of the fluid matter flowing through the pipe and convert the analog signals into digital signals; and
   an image reconstructor, communicatively coupled to the processor, to image a cross-section of a flow regime of the fluid matter.

2. The system of claim 1, wherein the optical light source is a light-emitting diode.

3. The system of claim 1, wherein the optical light source is an ultra-violet light-emitting diode.

4. The system of claim 1, wherein the optical light source is a laser.

5. The system of claim 1, wherein the sensor is a photodiode.

6. The system of claim 1, wherein readout rates of the optical light source and sensor are adjusted to obtain a series of images resolved in real time.

7. The system of claim 1, wherein the image reconstructor is further configured to determine volumetric flow rates of the fluid matter by imaging fluorescence cross-sections of the fluid matter flow at different spatial positions.

8. The system of claim 7, wherein the image reconstructor images the fluorescence cross-sections of the fluid matter flow by using two sensing rings comprised of a plurality of optical light sources and sensors.

9. The system of claim 1, wherein the at least one optical light source and the at least one sensor are arranged in a linear array.

10. The system of claim 1, wherein the at least one optical light source and the at least one sensor are arranged in a non-linear array.

11. The system of claim 1, wherein the at least one optical light source and the at least one sensor are arranged in a ring-shaped array.

12. A method of determining composition of fluid matter flowing through a pipe, the method comprising:
   transmitting light pulses from at least one optical light source to illuminate the fluid matter flowing through the pipe;
   directing a signal from the optical light source illuminating the fluid matter flowing through the pipe to at least one sensor;
   providing, by a bandpass filter that is positioned in front of the sensor, wavelength discrimination for determining attenuation and fluorescence of the fluid matter flowing through the pipe;
   transmitting, from the sensor, analog signals as a function of the attenuation and fluorescence of the fluid matter flowing through the pipe;
   converting the analog signals into digital signals;
   passing the digital signals into an image reconstructor; and
   imaging, by the image reconstructor, a cross-section of a flow regime of the fluid matter.

13. The method of claim 12, wherein the optical light source is a light-emitting diode, an ultra-violet light-emitting diode, or a laser.

14. The method of claim 12, wherein the sensor is a photodiode.

15. The method of claim 12, further comprising adjusting readout rates of the optical light source and the sensor to obtain a series of images resolved in real time.

16. The method of claim 12, further comprising determining, by the image reconstructor, volumetric flow rates of the fluid matter by imaging fluorescence cross-sections of the fluid matter flow at different spatial positions.

17. The method of claim 16, wherein the fluorescence cross-sections of the fluid matter flow is imaged by using two sensing rings comprised of a plurality of optical light sources and sensors.

18. The method of claim 12, wherein the at least one optical light source and the at least one sensor are arranged in a linear array.

19. The method of claim 12, wherein the at least one optical light source and the at least one sensor are arranged in a non-linear array.

20. The method of claim 12, wherein the at least one optical light source and the at least one sensor are arranged in a ring-shaped array.

* * * * *